United States Patent
Shim et al.

(10) Patent No.: US 6,853,850 B2
(45) Date of Patent: Feb. 8, 2005

(54) AUTOMATIC SPEAKER VOLUME AND MICROPHONE GAIN CONTROL IN A PORTABLE HANDHELD RADIOTELEPHONE WITH PROXIMITY SENSORS

(75) Inventors: Jae H. Shim, San Jose, CA (US); Ilwhan Park, Pleasanton, CA (US)

(73) Assignee: Mobigence, Inc., San Jose, CA (US)

( * ) Notice: Subject to any disclaimer, the term of this patent is extended or adjusted under 35 U.S.C. 154(b) by 440 days.

(21) Appl. No.: 09/730,412

(22) Filed: Dec. 4, 2000

(65) Prior Publication Data

US 2002/0068537 A1 Jun. 6, 2002

(51) Int. Cl.$^7$ ............................................... H04M 1/00
(52) U.S. Cl. ............................. 455/550.1; 455/569.1; 455/575.1; 379/432
(58) Field of Search ...................... 445/550.1, 569.1, 445/344, 347, 350, 351, 355, 575.1; 379/432, 433.01, 433.02, 433.03

(56) References Cited

U.S. PATENT DOCUMENTS 5,265,264 A * 11/1993 Dzung et al. ............... 455/90.2
5,884,156 A * 3/1999 Gordon ....................... 455/321
6,154,538 A * 11/2000 Nakano ................... 379/387.01

FOREIGN PATENT DOCUMENTS

JP          05-183621      *  7/1993    ............ H04M/1/60

* cited by examiner

Primary Examiner—Quochien B. Vuong

(57) ABSTRACT

Method and system for controlling operation of radiotelephone speaker volume and/or microphone gain. Using signals from one or more proximity sensors associated with the radiotelephone device, the device determines if a radiotelephone user is within a selected proximity zone for the device. If the user is within the proximity zone, the system adjusts the speaker volume control and/or the microphone gain control according to an estimated user-device distance. If the user is beyond the proximity zone, the system may adjust the speaker volume and/or microphone gain to its maximum value, may provide a notification that the user not within the proximity zone, or may disable the speaker and/or microphone. Several varieties of proximity sensors are used, individually and in combination.

20 Claims, 7 Drawing Sheets

AUTOMATIC SPEAKER VOLUME AND MICROPHONE GAIN CONTROL IN A PORTABLE HANDHELD RADIOTELEPHONE WITH PROXIMITY SENSORS

FIELD OF THE INVENTION

This invention relates to controlling speaker volume and microphone gain of communications devices, such as portable handheld radiotelephones.

BACKGROUND OF THE INVENTION

A portable handheld radiotelephone (referred to as a "radiotelephone" herein) is conventionally used by holding a built-in speaker and microphone near the user's ear and in close proximity to the user's mouth (collectively referred to as the "user's head" herein), respectively, during audio communication. During the audio communication, however, the user may prefer that the radiotelephone be located some distance away from the user, in a hands-free position.

In today's communication trends, a radiotelephone that integrates more text intensive applications, such as calendar, memo and other text-related applications is often inconvenient and difficult to hold in a conventional manner, because the device requires the user to view a display screen in order to gain access to an application, such as a calendar, while the user attempts to maintain optimum audio communication through the radiotelephone. In a preferred, if unnatural, position, the user holds the radiotelephone display screen near the user's eyes and manually adjusts a speaker volume control and/or microphone gain control to maintain audio communication with the radiotelephone in this position. Presently, speaker volume and microphone gain control are adjusted using manual switches, which are often inconvenient to reach and use. This arrangement may also cause damage to the user's ear, if the user forgets to return the manual switches to normal levels, when the user once again holds the radiotelephone speaker near the user's ear.

What is needed is an automatic speaker volume control system and/or microphone gain control system, based on sensing the radiotelephone position relative to the user or the user's head, where the user need not manually intervene to control speaker volume and/or microphone gain. Preferably, more than one sensing device and/or more than one type of sensing device should be optionally usable in order to reduce the possibility of error in relative position. Preferably, the system should distinguish between a proximity zone surrounding the user or user's head, in which the speaker volume and/or microphone gain can be continuously adjusted to provide optimum audio levels, and an outer zone where only maximum speaker volume and/or microphone gain are suitable for maintaining audio communication.

SUMMARY OF THE INVENTION

These needs are met by the invention, which provides one or more distance sensors on a radiotelephone to estimate a distance between the sensor and some portion of the user or user's head. The sensors are usable individually. Preferably, two or more such sensors are used together to provide an improved estimate of the sensor-user distance. The distance sensors include, but are not limited to, an infrared sensor, a photoelectric sensor, a sound reflection sensor, a capacitive sensor, and a temperature sensor, and a given sensor type may be provided at more than one location on the radiotelephone to account for the possibility that the radiotelephone may be placed in a rotated angular orientation relative to the user or user's head. A sensor estimates a sensor-head distance and compares this distance with a reference distance that defines a proximity zone surrounding the user or user's head. If the estimated sensor-head distance is no greater than the reference distance, the system automatically (e.g., electronically and/or mechanically) adjusts the speaker volume and/or the microphone gain to provide optimum audio signal levels for that situation. If the estimated sensor-head distance is greater than the reference distance, the system (1) adjusts the speaker volume and/or the microphone gain to its maximum signal level and/or (2) notifies the user that the maximum signal level may be inadequate to maintain acceptable audio communication and/or (3) disables the speaker and/or the microphone until the sensor-head distance is no greater than the reference distance or (4) takes no action. More than one proximity zone, each with its own reference distance and/or zone center, can be defined and sensed by the system. The minimum-to-maximum range for speaker volume and/or for microphone gain is adjustable for each user.

DESCRIPTION OF BEST MODES OF THE INVENTION

Figure 1A:
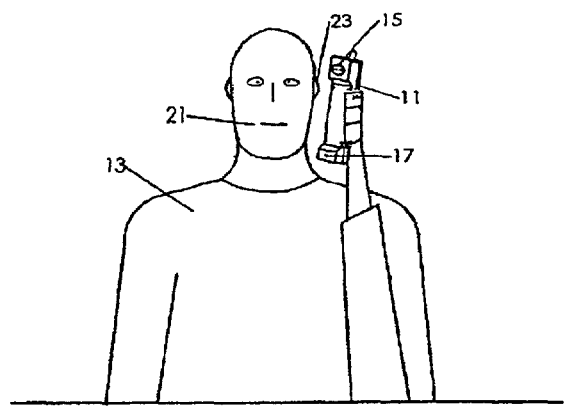
FIGS. 1A, 1B and 1C are perspective views of a radiotelephone, illustrating an ear position mode, a frontal position mode and a hands-free mode of operation.

FIG. 1A illustrates an ear-position mode of handheld use of a radiotelephone 11, in which a user 13 holds the radiotelephone so that the speaker 15 and microphone 17 of the device are positioned adjacent to the user's mouth 21 and to the user's ear 23, respectively. Here, the audio signal levels for the speaker 15 and microphone 17 may be adjusted by the user by varying the ear-speaker distance, using audio feedback that is unconsciously implemented by the user.

Figure 1B:
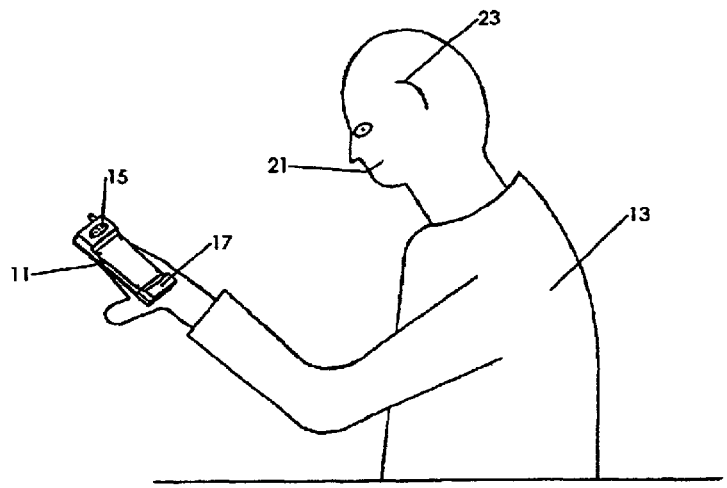

FIG. 1B illustrates a frontal position mode of handheld use of a radiotelephone 11, in which a user holds the radiotelephone in front of the user's face. Here, the user may need to manually adjust the speaker volume and/or microphone gain to provide adequate levels of audio signals.

Figure 1C:
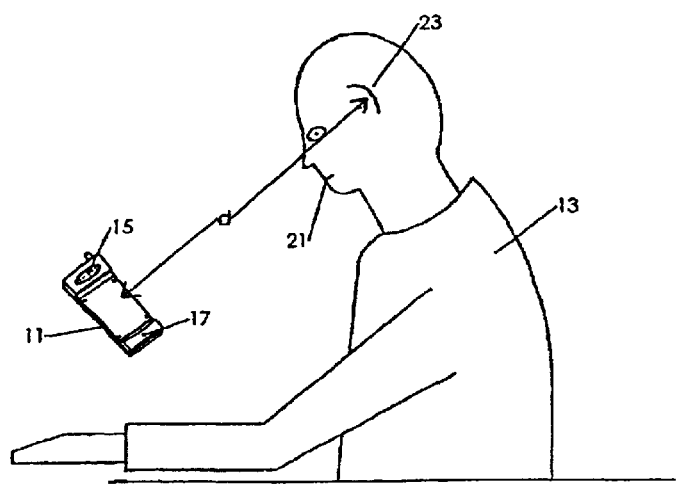

FIG. 1C illustrates a hands-free mode of use of the radiotelephone 11, in which the device is often set down or otherwise positioned at a selected angular orientation and distance d relative to the user 13, leaving the user's hands free to pursue other activities. In this mode of use, it would be necessary to manually adjust the speaker volume and/or microphone gain so that adequate audio signal levels are provided for the user 13. If the user 13 moves relative to the radiotelephone 11 during the audio communication, it would be necessary to manually readjust the audio signal levels, one or more times as the user moves around or shifts location or orientation relative to the radiotelephone. Alternatively, a separable loudspeaker might be provided for the user 13.

Figure 2:
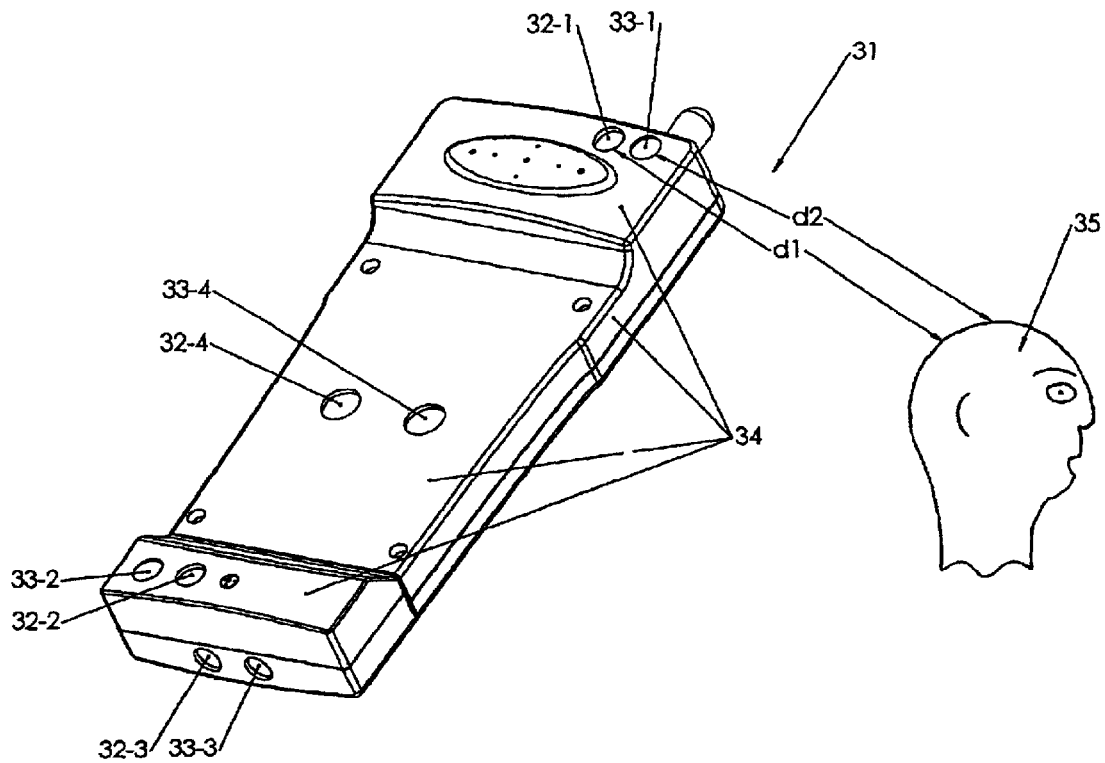
FIG. 2 illustrates suitable locations for a sensor.

The invention, illustrated in one embodiment in FIG. 2, provides the radiotelephone with a distance sensing and audio signal level adjustment system 31. The system 31 provides one or (preferably) more signal sources 32-$i$ and associated signal sensors 33-$i$($i$=1, 2, ... ) at selected locations and angular orientations on a radiotelephone 34, in order to estimate a distance d1 between a user's head 35 and one or more of the signal sources 32-1 and/or to estimate a distance d2 between a user's head 35 and one or more signal sensors 33-1. Preferably, a signal source 32-$i$ and associated signal sensor 33-$i$ are located adjacent to or contiguous to each other on the housing of the radiotelephone 34 so that the distance d1 from the signal source 32-$i$ to the user 35 (e.g., user's head or upper body portion) is substantially equal to the distance d2 from the user 35 to the associated signal sensor 33-$i$. However, the distances d1 and d2 may be substantially different from each other, if appropriate compensation is provided in the signal analysis. The radiotelephone system 31 may be used in a hands-free mode of operation, or may be used in the ear-position mode or the frontal position mode illustrated in FIGS. 1A, 1B and 1C, among other positions.

A signal source 32-$i$ and associated signal sensor 33-$i$ may be located at or near a corner of the radiotelephone housing 34 ($i$=1, 2 in FIG. 2), may be located along an edge of the housing ($i$=3), may be located on a relatively flat exposed surface of the housing ($i$=4), or may be located on a surface of the housing 34 that is not shown in FIG. 2. It is preferable to provide two or more signal sources 32-$i$ and two or more associated signal sensors 33-$i$ on the radiotelephone housing 34 in order to provide for arbitrary angular orientation of the radiotelephone system 31 relative to the user 35.

Each signal source 32-$i$ and each associated signal sensor 33-$i$ will have a characteristic variation of signal intensity or signal sensitivity with an incidence angle $\phi$, measured about a central direction. These variations with incidence angle should be accounted for in placing and orienting the signal sources 32-$i$ and signal sensors 33-$i$ on the radiotelephone housing 34.

A suitable signal sensor may rely upon emission, reflection and receipt of infrared or radiowave signals (frequencies f=$10^9$ Hz–$4\times10^{14}$ Hz), photoelectric signals (f=$4\times10^{14}$ Hz–$10^{15}$ Hz), or sound signals (f=200 Hz–$10^4$ Hz), may rely upon a capacitive proximity sensor (capacitance changes monotonically with distance of the sensor from the body of a nearby object, such as a human being), and/or may rely upon receipt of signals representing temperature of an emitting object, such as the user's exposed head.

Where an infrared, radiowave, photoelectric or sound signal is received and sensed, this signal preferably has a signature (e.g., a special combination or sequence of frequencies) or is emitted only during a special gating time interval (analogous to radar signals) to distinguish this signal from background signals. A capacitive proximity sensor and a temperature sensor do not require emission of a standard electrical signal in order to sense proximity of the object.

Figure 3:
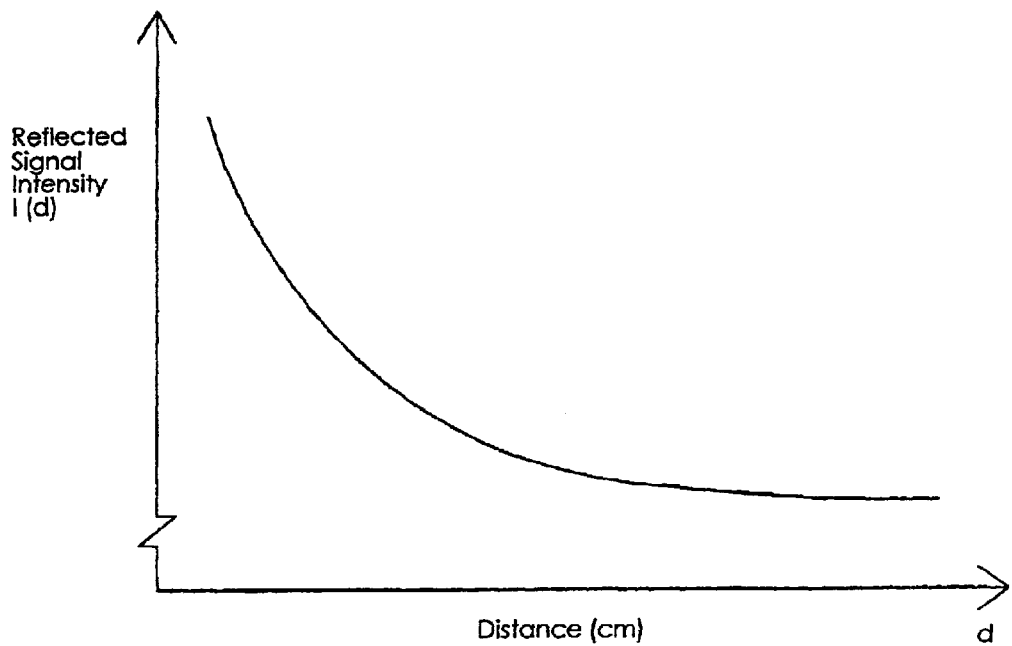
FIG. 3 graphically illustrates an approximate relationship between an intensity of a reflected signal and a distance between a signal source-sensor and a signal-reflecting object.

The signal intensity I(d) for a received infrared, radiowave, photoelectric and sound signal reflected from a reflecting surface will decrease with distance d (=d1=d2) to the reflecting surface approximately as $$I(d)=(d+d0)^{-m}\exp\{-\alpha d\}, \qquad (1)$$

where m is a selected positive number (e.g., m=2–4), d0 is a selected non-negative distance and $\alpha$ is a selected non-negative absorption coefficient. The choices d0=0, m=2 and $\alpha$=0 reproduce the well known inverse square law. Choice of an absorption parameter value $\alpha$>0 allows one to account for partial absorption of the signal by an ambient medium, where $\alpha$ may vary with wavelength or frequency of the signal. FIG. 3 graphically and approximately illustrates variation of intensity I(d) with distance d for such signals. The parameters d0, m and/or $\alpha$ may vary with the type of signal used, with the angular orientation of the reflecting surface relative to the signal source and signal sensor, and/or with the type of reflecting surface.

Figure 4:
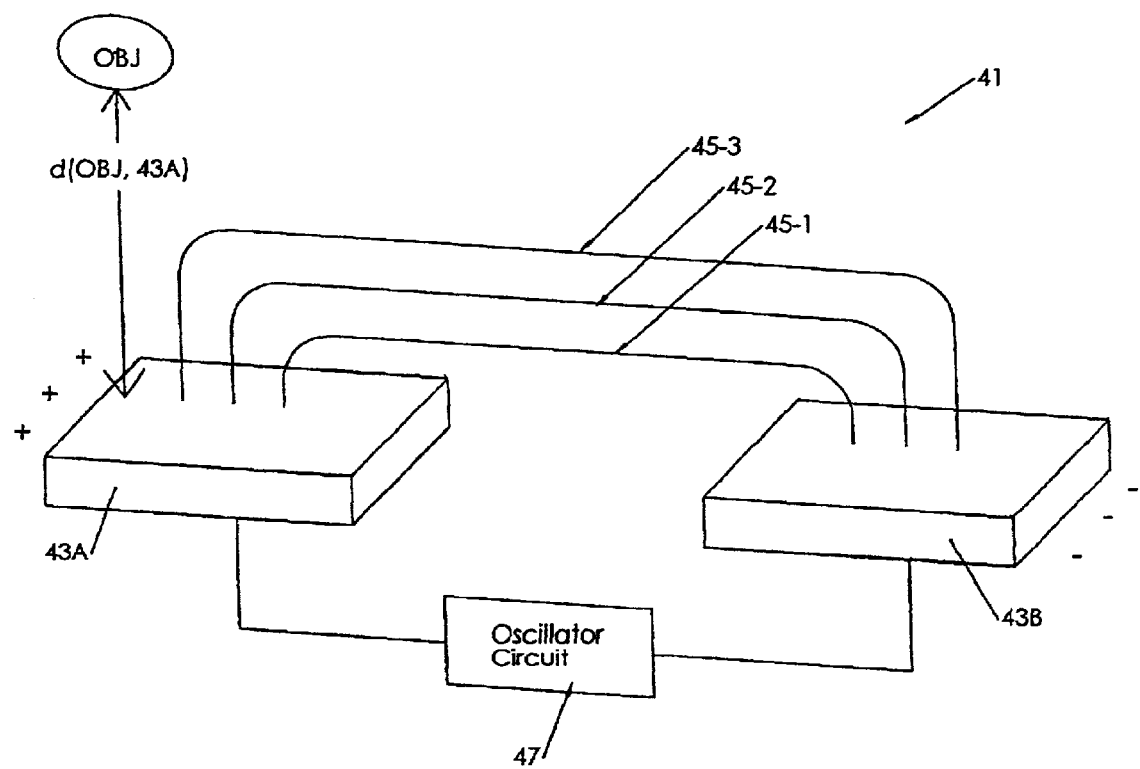
FIG. 4 schematically illustrates use of a capacitive proximity sensor.

FIG. 4 illustrates one version of a capacitive proximity sensor 41, in which first and second electrically conducting plates, 43A and 43B, are separated or insulated from each other, with a positive voltage or charge and a negative voltage or charge applied to the first plate and to the second plate, respectively. Electrical field lines 45-$i$ develop between the two plates, 43A and 43B, with each line having a source on one plate and a sink or destination on the other plate. The ambient medium (e.g., air or another fluid) between the two plates serves as a dielectric for the field lines 45-$i$. The two plates, 43A and 43B, are connected to a resonant oscillatory circuit 47, having a form well known in the art, with circuit parameters chosen so that, when the field lines are undisturbed, the system oscillates at a reference frequency f0. When an object OBJ is moved through a portion of space covered by some of the field lines 45-$i$, a number N of these field lines are disturbed. The number N of disturbed field lines increases monotonically as the distance d(OBJ,plate) of the object OBJ from a plane defined by one or both of the plates decreases. As more and more of the field lines are disturbed, corresponding to decrease of the distance d(OBJ,plate), the circuit oscillatory frequency f moves further and further from its reference frequency, and the magnitude |f−f0| is a measure of the distance d(OBJ,plate). This form of capacitive proximity sensor uses an oscillatory signal produced within the circuit 47, including the field lines 45-$i$, but does not require generation and transmission of an electromagnetic signal from this sensor to the object whose proximity is being sensed.

Figure 5:
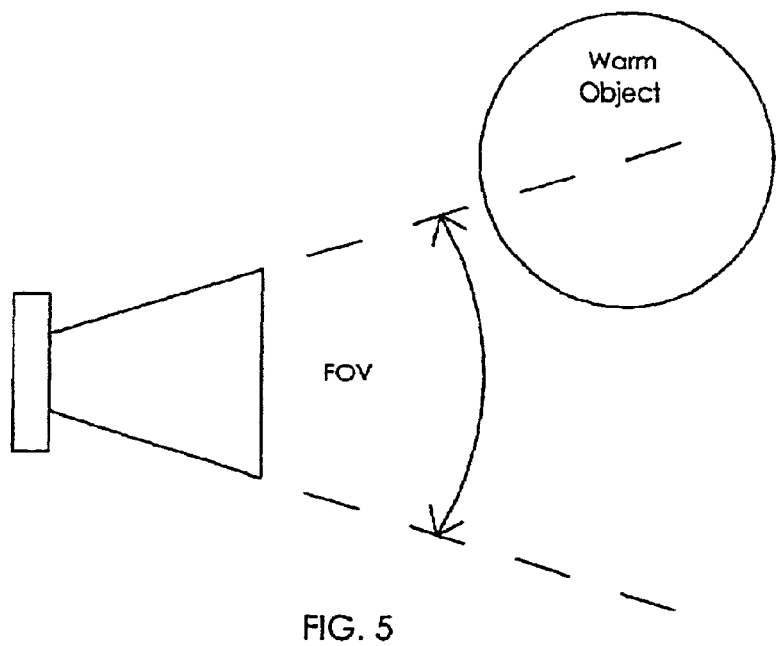
FIG. 5 schematically illustrates use of temperature sensing to estimate distance and a field of view of the sensor.
Figure 6:
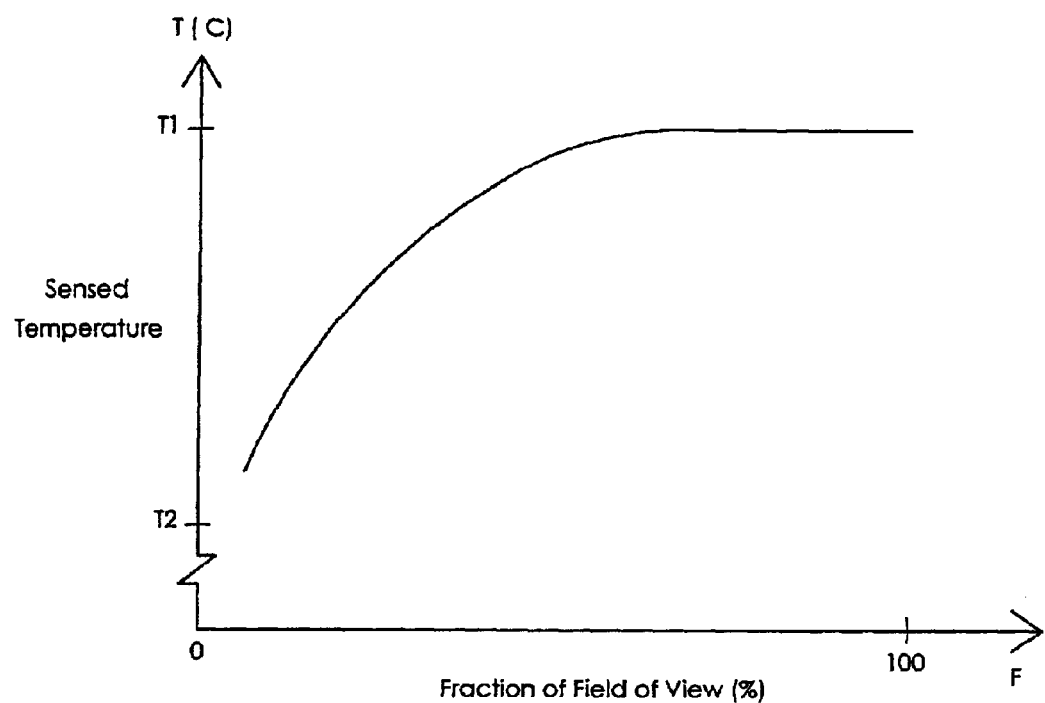
FIG. 6 graphically illustrates variation of sensed temperature with the fraction F of sensor field of view occupied by a warm or hot object.

A temperature sensor does not require a signal generator; the signal generator is the object surface itself. If the object is a head of a living human being, the temperature T sensed will be relatively high (e.g., T=32–36° C.), if the temperature sensor is located reasonably close to the head and will be substantially lower (e.g., T=10–25° C.), if the object is an inanimate object in the interior of a building. A temperature sensor will have a certain angular field of view FOV, as illustrated in FIG. 5. If the FOV includes only a relatively warm object, such as a human head, the sensed temperature T1 will be relatively high. As the orientation of the temperature sensor changes and a greater and greater fraction F of the sensor's FOV is taken up with one or more inanimate (and cooler) objects, the sensed temperature T will decrease toward a lower temperature T2, as graphically illustrated in FIG. 6.

Figure 7:
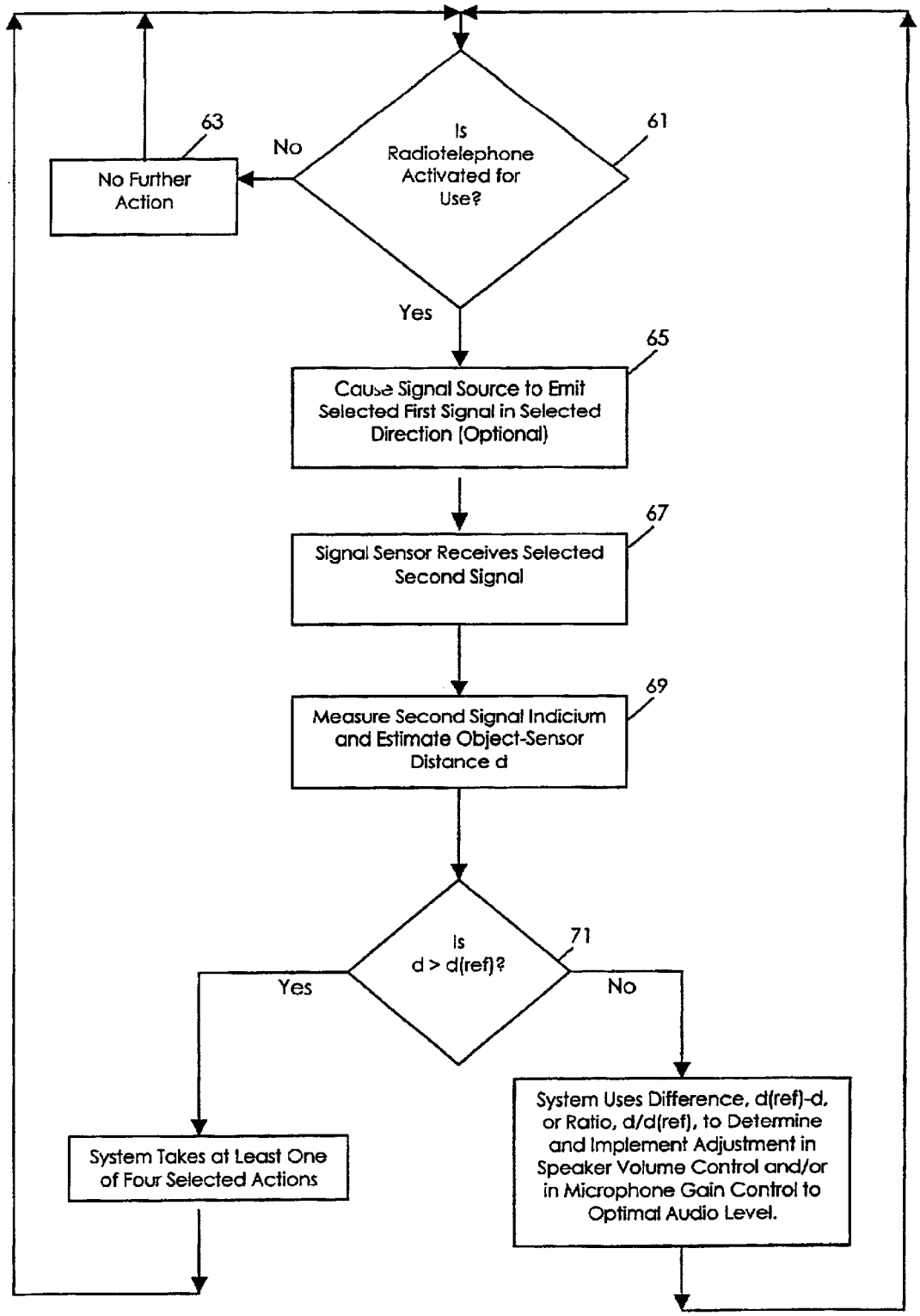
FIG. 7 is a flow chart of a method for practising the invention.

FIG. 7 is a flow chart of a method for practising the invention. In step 61, a system determines if a particular radiotelephone is activated for use. A radiotelephone is "activated for use" if one or more selected functions on the device is being used presently. These selected functions may include one or more of: (1) radiotelephone voice activation, (2) entry of numbers or other alphanumeric information using the keypad and (3) any other function that indicates that the radiotelephone is being readied for use in a conversational mode.

If the answer to the query in step 61 is "no", the system takes no further action, in step 63 and/or returns to step 61. If the answer to the query in step 61 is "yes", a sensor signal source optionally emits a selected first signal in a selected direction, in step 65. In step 67, a signal sensor, located on the radiotelephone, receives a selected second signal, which may be a result of reflection of the first signal from a nearby object. In step 69, the system measures a signal indicium that represents or corresponds to distance d from the object to the radiotelephone sensor (e.g., signal intensity, temperature, etc.) and estimates the distance d. In step 71, the system compares the distance d with a reference distance d(ref) and determines if d is greater than d(ref).

If the answer to the query in step 71 is "yes", the takes at least one of four selected actions, in step 73: (1) the system adjusts the speaker volume and/or the microphone gain of the radiotelephone to its maximum signal level; (2) the system notifies the radiotelephone user that the user is outside a proximity zone (using a visually perceptible or audibly perceptible signal, for example) and/or that the maximum signal level may be inadequate to maintain acceptable audio communication; (3) the system disables the speaker and/or the microphone until the sensor-head distance is no greater than the reference distance d(ref); and (4) the system makes no (further) adjustment in speaker volume and/or microphone gain. If the answer to the query in step 71 is "no", the system, in step 75, uses at least one of two distance comparison indicia, the difference, d(ref)−d, and the ratio, d/d(ref), to automatically determine and implement an adjustment in speaker volume and/or in microphone gain for the radiotelephone, to an audio signal level that is no greater than the maximum signal level. If the sensor used here is temperature, capacitive response or another signal that is provided by the object itself, step 65 is deleted here. The speaker volume adjustment and the microphone gain adjustment may be proportional to each other, or these two adjustments may be made independently of each other, based on the separate audio characteristics of a speaker and a microphone.

Figure 8:
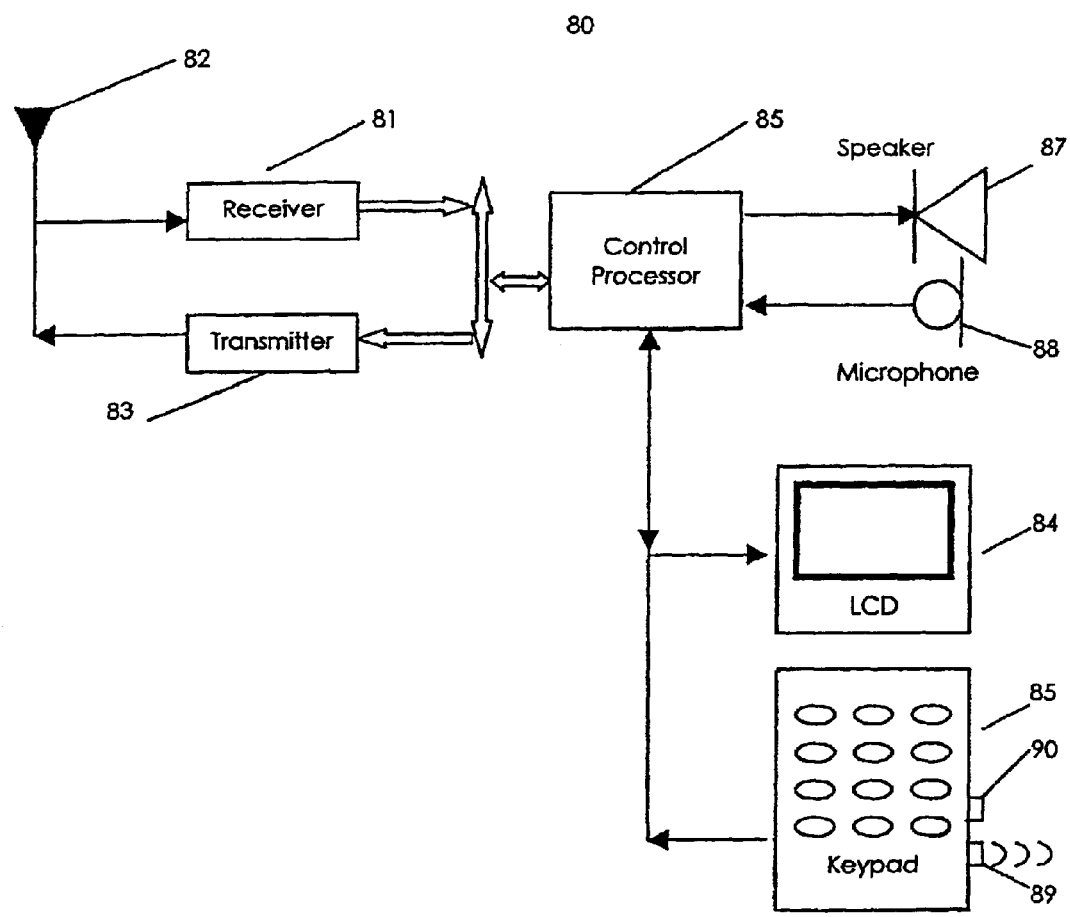
FIG. 8 schematically illustrates a conventional radiotelephone incorporating the invention.

FIG. 8 is a schematic view of a radiotelephone 80 powered by a battery or other power source. The radiotelephone 80 includes an a signal receiver 81 for audio and/or data signals, connected to an antenna 82, to receive signals from an audio signal source and/or a data signal source, spaced apart from the radiotelephone, and a signal transmitter 83, also connected to the antenna, to transmit audio and/or data signals to an intended recipient. The radiotelephone 80 includes a display sub-system 84, to display alphanumeric text including telephone numbers, and a keypad 85 with alphanumeric keys to enter a called party's telephone number and other alphanumeric characters. The radiotelephone 80 includes a control processor 86, optionally including a memory unit, to control the processing of audio and/or data signals received from or to be sent to the antenna 82. The radiotelephone 80 also includes a speaker 87 and a microphone 88 whose signals are also processed by the control processor. A portable radiotelephone also includes a battery or other source of electrical power for the other components. The radiotelephone 80 includes one or more proximity signal sources 89 and one or more proximity signal sensors 90, located on or adjacent to the radiotelephone housing.

Optionally, the minimum speaker volume $V_s(min)$, the maximum speaker volume $V_s(max)$, the minimum microphone gain $G_m(min)$ and/or the maximum microphone gain $G_m(max)$ is adjustable by the user to fit the user's own auditory characteristics. A radiotelephone user that is partly hearing-impaired will choose higher values for $V_s(min)$ and $V_s(max)$. A radiotelephone user whose voice is much stronger than average will choose smaller values for $G_m(min)$ and $G_m(max)$.

Figure 9:
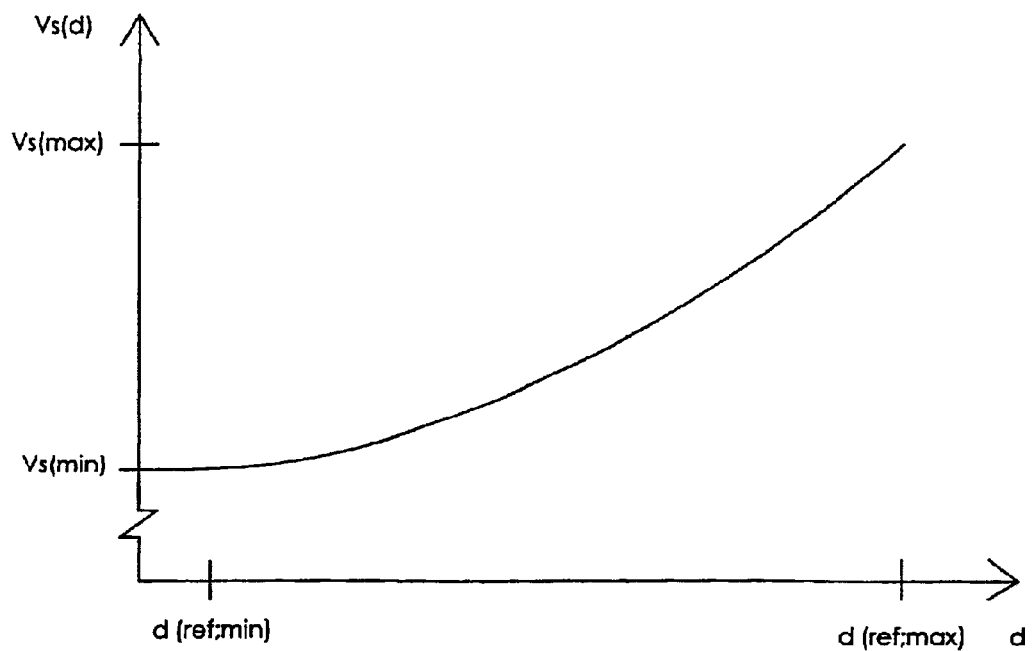
FIGS. 9 and 10 graphically illustrate suitable variations of speaker volume and microphone gain with estimated user distance d.
Figure 10:
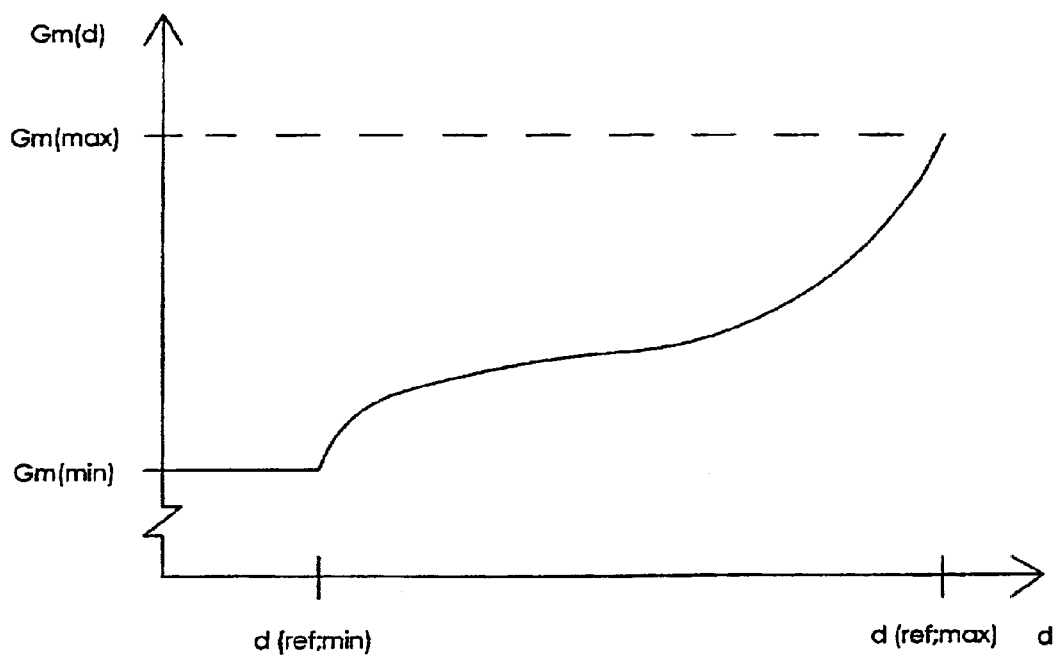

FIGS. 9 and 10 graphically illustrate how the speaker volume $V_s$ and the microphone gain $G_m$ may be caused to vary between their respective minimum and maximum values, as a function of estimated distance d from the signal sensor to an object (e.g., radiotelephone user), as d varies from d(min)=0 to a maximum distance d(max) that may be a measure of the proximity zone. The speaker volume $V_s(d)$ (and, similarly, the microphone gain $G_m(d)$) may "plateau" at a relatively small positive number $V_{s0}=V_s(min)$ for distances d less than a minimum reference distance d(ref; min)>0, as shown in FIGS. 9 and 10. Otherwise, d(ref; min) may be set equal to 0. The quantities $V_s(d)$ and $G_m(d)$ increase monotonically, preferably strictly monotonically, with increasing radiotelephone-user distance d beyond d(ref; min) up to a distance d(ref; max) that corresponds to a radius of the proximity zone.

Preferably, distance estimates provided by two or more sensors, or by two or more sensors of different types, are used in combination to determine a best estimate of the user-radiotelephone distance.

What is claimed is:

1. A method for controlling operation of a radiotelephone, the method comprising:

determining if a radiotelephone is activated for use;

when the radiotelephone is activated, determining when the radiotelephone is within a selected proximity zone of a radiotelephone user;

when the radiotelephone is activated and is within the proximity zone, estimating a distance d between the radiotelephone and the user and adjusting a volume control for a radiotelephone speaker according to the estimated distance, providing a minimum value $V_s(min)$ of the sneaker volume control and a maximum value $V_s(max)$ of the speaker volume control, and allowing the sneaker volume control to vary monotonically with the distance d between the values $V_s(min)$ and $V_s(max)$.

2. The method of claim 1, further comprising:

when said radiotelephone is activated and is not within said proximity zone, taking at least one of the following actions: refraining from adjusting said speaker volume control; automatically adjusting said speaker volume control to a maximum audio level; providing a notification that said radiotelephone is not within said proximity zone; and automatically disabling said speaker until said radiotelephone is within said proximity zone.

3. The method of claim 1, further comprising allowing at least one of said values $V_s(min)$ and $V_s(max)$ to be adjusted by said user.

4. The method of claim 1, further comprising:

when said radiotelephone is activated, and is within said proximity zone, adjusting a radiotelephone microphone gain control according to said estimated distance.

5. The method of claim 4, further comprising:
when said radiotelephone is activated and is not within said proximity zone, taking at least one of the following actions: refraining from adjusting said microphone gain control; automatically adjusting said microphone gain control to a maximum audio level; providing a notification that said radiotelephone is not within said proximity zone; and automatically disabling said microphone until said radiotelephone is within said proximity zone.

6. The method of claim 4, further comprising:
providing a minimum value $G_m(min)$ of said microphone gain control and a maximum value $G_m(max)$ of said microphone gain control; and
allowing said microphone gain control to vary monotonically with said distance d between the values $G_m(min)$ and $G_m(max)$, when said radiotelephone is within said proximity zone.

7. The method of claim 6, further comprising allowing at least one of said values $G_m(min)$ and $G_m(max)$ to be adjusted by said user.

8. The method of claim 1, further comprising determining whether said radiotelephone is within said proximity zone by a procedure comprising at least one of the following processes:
(i) transmitting at least one infrared signal, allowing the infrared signal to be reflected from a signal-reflecting object, measuring the signal strength of the reflected infrared signal as received at said radiotelephone, and comparing the reflected infrared signal with at least one selected threshold infrared signal strength;
(ii) transmitting at least one photoelectric signal, allowing the photoelectric signal to be reflected from a signal-reflecting object, measuring the signal strength of the reflected photoelectric signal as received at said radiotelephone, and comparing the reflected photoelectric signal with at least one selected threshold photoelectric signal strength;
(iii) transmitting at least one sound signal, allowing the sound signal to be reflected from a signal-reflecting object, measuring the signal strength of the reflected sound signal as received at said radiotelephone, and comparing the reflected sound signal with at least one selected threshold sound signal strength;
(iv) estimating a distance from an object to a capacitive sensor located at said radiotelephone; and
(v) estimating a temperature of a selected surface within said proximity zone and comparing the estimated temperature with at least one threshold temperature.

9. The method of claim 8, further comprising providing at least one of said infrared signal, said photoelectric signal and said sound signal with a selected signal indicium that distinguishes this signal from a background signal.

10. The method of claim 8, further comprising choosing said at least one threshold temperature to be at least 32° C.

11. A system for controlling operation of a radiotelephone, the system comprising:
a detection mechanism that determines when a radiotelephone is activated for use;
a distance sensor, associated with the radiotelephone, that estimates a distance d from the radiotelephone to the user, and that determines when the radiotelephone is within a selected radiotelephone proximity zone;
a speaker volume control, connected to a speaker on the radiotelephone, that receives the estimated distance and adjusts the speaker volume according to the estimated distance between the radiotelephone and the user, that provides a minimum value $V_s(min)$ of the speaker volume and a maximum value $V_s(max)$ of the speaker volume, and that allows the speaker volume to vary monotonically with the distance d between the values $V_s(min)$ and $V_s(max)$, when the radiotelephone is within the proximity zone and is activated for use.

12. The system of claim 11, wherein said system is configured so that:
when said radiotelephone is activated and is not within said proximity zone, said system takes at least one of the following actions: refraining from adjusting said speaker volume control; automatically adjusting said speaker volume control to a maximum audio level; providing a notification that said radiotelephone is not within said proximity zone; and automatically disabling said speaker until said radiotelephone is within said proximity zone.

13. The system of claim 11, wherein said system is configured to allow at least one of said values $V_s(min)$ and $V_s(max)$ to be adjusted by said user.

14. The system of claim 11, further comprising a microphone gain control, connected to a microphone on said radiotelephone, that receives said estimated distance and adjusts the microphone gain according to said estimated distance between said radiotelephone and said user, when said radiotelephone is within said proximity zone.

15. The system of claim 14, wherein said system is configured so that:
when said radiotelephone is activated and is not within said proximity zone, said system takes at least one of the following actions: refraining from adjusting said microphone gain control; automatically adjusting said microphone gain control to a maximum audio level; providing a notification that said radiotelephone is not within said proximity zone; and automatically disabling said microphone until said radiotelephone is within said proximity zone.

16. The system of claim 14, wherein said system is configured:
to provide a minimum value $G_m(min)$ of said microphone gain control and a maximum value $G_m(max)$ of said microphone gain control; and
to allow said microphone gain control to vary monotonically with said distance d between the values $G_m(min)$ and $G_m(max)$, when said radiotelephone is within said proximity zone.

17. The system of claim 16, wherein said system is configured to allow at least one of said values $G_m(min)$ and $G_m(max)$ to be adjusted by said user.

18. The system of claim 11, wherein said system determines whether said radiotelephone is within said proximity zone by a procedure comprising at least one of the following processes:
(i) transmitting at least one infrared signal, allowing the infrared signal to be reflected from a signal-reflecting object, measuring the signal strength of the reflected infrared signal as received at said radiotelephone, and comparing the reflected infrared signal with at least one selected threshold infrared signal strength;
(ii) transmitting at least one photoelectric signal, allowing the photoelectric signal to be reflected from a signal-reflecting object, measuring the signal strength of the reflected photoelectric signal as received at said radiotelephone, and comparing the reflected photoelectric signal with at least one selected threshold photoelectric signal strength;

(iii) transmitting at least one sound signal, allowing the sound signal to be reflected from a signal-reflecting object, measuring the signal strength of the reflected sound signal as received at said radiotelephone, and comparing the reflected sound signal with at least one selected threshold sound signal strength;

(iv) estimating a distance from an object to a capacitive sensor located at said radiotelephone; and (v) estimating a temperature of a selected surface within said proximity zone and comparing the estimated temperature with at least one threshold temperature.

19. The system of claim 18, wherein at least one of said infrared signal, said photoelectric signal and said sound signal is provided with a selected signal indicium that distinguishes this signal from a background signal.

20. The system of claim 18, wherein said at least one threshold temperature is chosen to be at least 32° C.

* * * * *